United States Patent [19]

Eckler et al.

[11] Patent Number: 4,738,720

[45] Date of Patent: Apr. 19, 1988

[54] ANTI-CORROSIVE PROTECTIVE COATINGS

[75] Inventors: Paul E. Eckler; Louis M. Ferrara, both of Terre Haute, Ind.

[73] Assignee: International Minerals & Chemical Corp., Terre Haute, Ind.

[21] Appl. No.: 930,392

[22] Filed: Nov. 14, 1986

[51] Int. Cl.$^4$ .............................................. C04B 9/02
[52] U.S. Cl. .............................. 106/14.05; 106/14.39
[58] Field of Search ........................ 106/14.05, 14.39

[56] References Cited

U.S. PATENT DOCUMENTS 4,337,092 6/1982 Hestermann et al. ............ 106/14.05
4,419,137 12/1983 Cayless et al. .................... 106/14.39
4,469,521 9/1984 Salensky ........................... 106/14.05
4,615,918 10/1986 Reichert et al. .................. 106/14.05

FOREIGN PATENT DOCUMENTS 2071070 9/1981 United Kingdom .

Primary Examiner—Paul Lieberman
Assistant Examiner—Willie J. Thompson
Attorney, Agent, or Firm—Robert H. Dewey; Thomas L. Farquer

[57] ABSTRACT

A corrosion inhibiting pigment consisting essentially of a comminuted natural zeolite or a calcium-exchanged zeolite.

8 Claims, No Drawings

ANTI-CORROSIVE PROTECTIVE COATINGS

BACKGROUND OF THE INVENTION

This invention relates to anti-corrosion protective coatings. In a particular aspect this invention relates to corrosion-inhibiting pigments for protective coatings. Metal objects in general, and steel or iron objects in particular, are usually protected from corrosion by a protective coating, preferably one containing a corrosion inhibiting pigment. Previously, pigments such as red lead, zinc chromate, zinc phosphate, barium metaborate, and zinc dust have been used. More recently, "calcium exchanged silica" was disclosed by British Petroleum Co. and encompassed by, British Pat. No. 2,071,070B.

It is an object of this invention to provide anti-corrosion protective coatings.

It is another object of this invention to provide corrosion-inhibiting pigments.

It is still yet another object of this invention to provide metal articles coated with the protective coating of this invention.

Other objects of this invention will be apparent to those skilled in the art from the disclosure herein.

SUMMARY OF THE INVENTION

It is discovery of this invention to provide a corrosion-inhibiting pigment comprising comminuted calcium zeolite. It is also an embodiment of this invention to provide protective coatings containing the calcium zeolite and metal articles coated with the coating. It is another embodiment of this invention to use natural clinoptilolite as a pigment extender in protective coatings.

DETAILED DESCRIPTION

The pigments of this invention comprise a comminuted zeolite such as calcium zeolite or naturally occurring clinoptilolite (sodium zeolite). Zeolites are very well known. Primarily alumino silicates of sodium, potassium, magnesium or calcium, they occur both naturally and synthetically and with considerable variation in the Al:Si ratio. They can be represented by the formula $M_{2/n}O.Al_2O_3.ySiO_2.wH_2O$ where y is 2 or greater, n is the cation valence and w is the water contained in the voids of the zeolite. The zeolites preferred for the practice of this invention include but are not limited to the naturally occurring ones, especially mordonite and clinoptilolite. The latter is particularly preferred. Synthetic calcium zeolite is also a preferred zeolite. For further discussion of zeolites, there can be mentioned the article "Molecular Sieves" by D. W. Breck and R. A. Anderson in the Concise Encyclopedia of Chemical Technology, pp 772-774, Kirk-Othmer (1985).

According to the process for preparing the calcium zeolite pigment of this invention, clinoptilolite or mordonite is repeatedly exposed to calcium chloride solution, then washed, dried and ground to pigment size.

The corrosion-inhibiting pigment of the present invention can be used with any protective coating, many of which are known, such as those based on alkyd resins or drying oils, e.g. paints, varnishes, lacquers, waterborne coatings, etc. The pigment of this invention can be merely substituted on a weight basis for a previously employed pigment, but preferably the amount is determined by the relative bulking values of the pigment, inasmuch as volume rather than weight of pigment determines the covering effectiveness. The protective coating itself, minus the corrosion-inhibiting pigment, forms no part of the invention-only the combination of the coating and the pigment.

The invention will be better understood with reference to the following examples. It is understood, however, that the examples are intended only to illustrate the invention. It is not intended that the invention be limited thereby.

EXAMPLE 1

Calcium zeolite (or, more precisely, calcium-exchanged zeolite) was prepared as follows. Castle Creek clinoptilolite zeolite 100 g was placed in a vessel equipped with a stirrer. There was added about 800 ml of a calcium chloride solution having a concentration of 40 g $CaCl_2.2H_2O$ and a temperature of about 70° C. The mixture was agitated for 30 min., allowed to settle and decanted. This procedure was repeated nine more times (10 in all). The calcium zeolite was then washed 8 times with 500 ml of deionized water each time. The final product was filtered and dried overnight at 100° C. The yield was 78.25 g. The product was ground in a shatter box mill to 10–14 microns. This size is larger than optimum (about 1 micron) but was the smallest attainable in a reasonable time with the equipment available. The product analyzed as follows: CEC 109.7; Ca 28.7; K 25.6; Mg 6.25; Na 14.1 meq./100 g; $H_2O$ 5.46%.

EXAMPLE 2

The calcium zeolite prepared as per Example I was used in a commercial-type paint formula. The resin was an epoxy-modified amino resin crosslinked baking polyester (Dynapol L-205) intended as a coil coating primer for use on steel articles such as siding and building panels.

A resin solution was prepared by dissolving 300 parts by weight of the above resin in a solvent consisting of 420 parts by weight of aromatic hydrocarbon and 280 parts of ethoxyethyl acetate.

The following formula was used:

| | |
|---|---|
| Resin solution | 400 parts wt. |
| Ethoxyethyl acetate | 52 |
| Silica | 3 |
| Mica | 15 |
| Anti-Corrosive pigment | 75 |
| Titanium dioxide | 55 |

The above ingredients were ground in a ball mill to Hegman 6+, then the following was added:

| | |
|---|---|
| Resin solution | 330 |
| Amino resin* | 50 |
| Epoxy resin** | 20 |

*Cymel 325, American Cyanamid Corp.
**Epon 828, Shell Chemical Corp.

A paint prepared by the above formula was used for testing the calcium zeolite combination as an anti-corrosive pigment. As a control a similar formulation was prepared using K White #82 (a commercial pigment of aluminum phosphate, diatomaceous earth and zinc oxide) as the anti-corrosive pigment. The two paints were applied to 4"× " Bonderite 1000 panels using a No. 66 wine-wound rod as an applicator. The panels were baked as 350° F. for 30 secs. with less than 2 min. prior flash time. The dry film thickness was 1.2–1.2 mils. Properties of the films are given in Table 1. The anti-corrosive properties were tested by the method of ASTM-B117. The anti-corrosive properties of calcium on zeolite wre equal to or better than those of the control.

TABLE 1

| Paint and Film Properties | | |
| --- | --- | --- |
|  | Control | Ex. 2 |
| Viscosity, Stormer, KU, initial | 84 | 80 |
| After 4 weeks at 120° F. | 110 | 89 |
| Film properties | | |
| Pencil Hardness | 3–4H | 4H |
| Reverse Impact | 50 | 60 |
| Crosshatch Adhesion | 100 | 100 |
| Gloss, 60° | 20–25 | 24 |
| 20°° | 4 | 4 |

EXAMPLE 3

The experiment of example 2 was repeated in all essential details except that comminuted natural clinoptilolite was substituted for the calcium zeolite of example I as the corrosion inhibitor. The natural zeolite was inferior to the control as a corrosion-inhibiting pigment but it was compatible with the paint and shows utility as a pigment extender for paints.

EXAMPLE 4

The experiment of example I is repeated in all essential details except that mordonite is substituted for clinoptilolite as the zeolite. The product consists of calcium-exchanged mordonite.

EXAMPLE 5

The experiment of example 2 is repeated in all essential details except that calcium-exchanged mordonite is substituted for the calcium clinoptilolite. The pigment provides excellent corrosion-inhibiting properties to the paint.

We claim:

1. A corrosion-inhibiting pigment consisting essentially of a comminuted calcium-exchanged zeolite.
2. The pigment of claim 1 wherein the zeolite is clinoptilolite.
3. The pigment of claim 1 wherein the zeolite is mordonite.
4. A corrosion-inhibiting protective coating consisting essentially of a protective coating and the corrosion-inhibiting pigment of claim 1.
5. A metal article coated with the coating of claim 4.
6. A paint consisting essentially of a film-former, a pigment and a pigment extender, the pigment extender being a natural zeolite.
7. The paint of claim 6 wherein the zeolite is clinoptilolite.
8. The paint of claim 6 wherein the zeolite is mordonite.

* * * * *

UNITED STATES PATENT AND TRADEMARK OFFICE
CERTIFICATE OF CORRECTION

PATENT NO. : 4,738,720
DATED : April 19, 1988
INVENTOR(S) : Paul E. Eckler and Louis M. Ferrara It is certified that error appears in the above-identified patent and that said Letters Patent are hereby corrected as shown below:

Column 1, line 28, following the word "is" insert -- the --

Column 2, line 67, "4" x "" should read -- 4" x 12" --

Column 2, line 68, "wine-wound" should read -- wire-wound --

Column 3, line 2, "1.2-1.2" should read -- 1.1-1.2 --

Column 3, line 6, "wre" should read -- were --

Signed and Sealed this

Twenty-seventh Day of September, 1988

Attest:

DONALD J. QUIGG

Attesting Officer     Commissioner of Patents and Trademarks